June 22, 1926.
P. A. GOULD
1,589,802
APPARATUS FOR LOCATING OCCLUSAL PLANES
Filed July 23, 1925    2 Sheets-Sheet 1
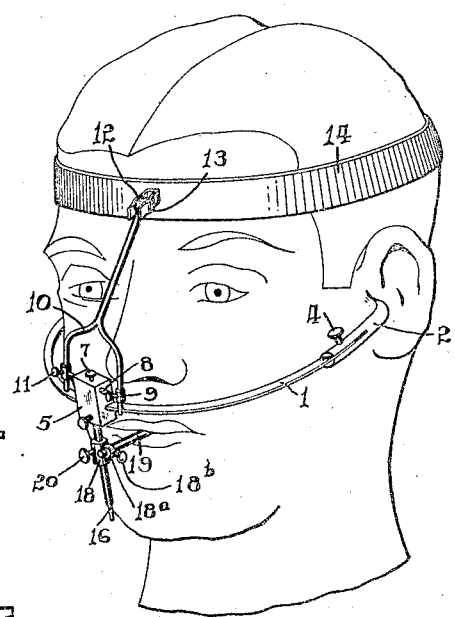
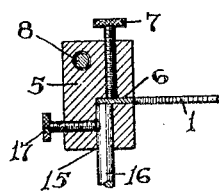
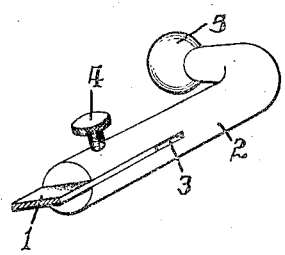
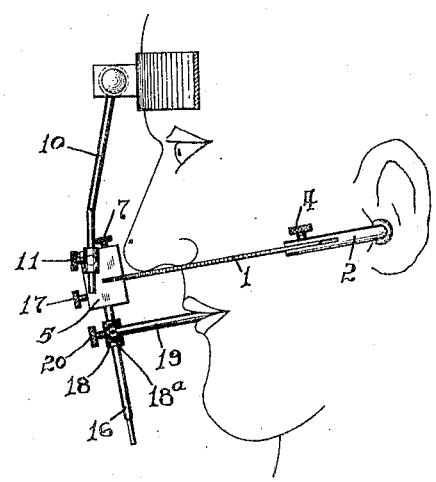
Inventor
Percival A. Gould
By Owen, Owen & Crampton
Attorneys June 22, 1926.
P. A. GOULD
1,589,802
APPARATUS FOR LOCATING OCCLUSAL PLANES
Filed July 23, 1925  2 Sheets-Sheet 2
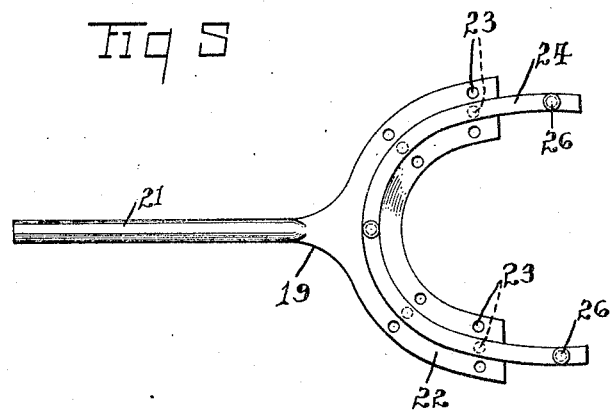
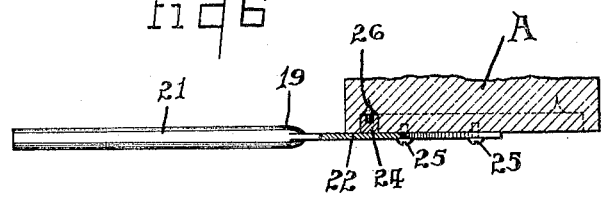
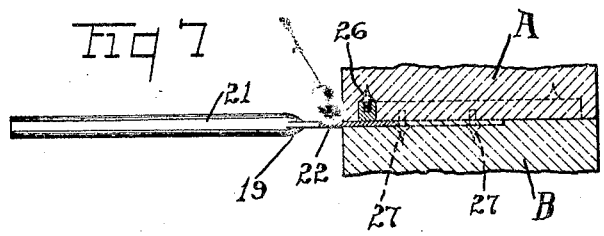
Inventor
Percival A. Gould
By Owen, Owen & Crampton
Attorneys Patented June 22, 1926.

1,589,802

UNITED STATES PATENT OFFICE.

PERCIVAL A. GOULD, OF GIBSONBURG, OHIO.

APPARATUS FOR LOCATING OCCLUSAL PLANES.

Application filed July 23, 1925. Serial No. 45,480.

This invention relates to dental apparatus but is more particularly concerned with a measuring apparatus for properly and accurately determining the occlusal plane of individual patients in prosthetic articulation.

In my copending application, Serial No. 38,626, filed June 22nd, 1925, I have shown and described an articulator for articulating artificial dentures. This apparatus includes a vertically disposed pin which is termed the incisal guide pin and this pin is movable relatively to and is guided by a plate which is angularly positioned, the parts of the articulator being so connected and arranged that a movement is obtained corresponding to the movement of the human mandible. Vertically adjustable on the incisal guide pin is a pointed block which is set at a point coincident with the occlusal plane of the patient and thereafter the plaster models are built up on the articulating members in accordance with the adjusted position of the pointed block.

Considerable difficulty has heretofore been experienced in accurately positioning the above mentioned pointed block for individual patients and so far as I am aware no efficient measuring apparatus has been produced for conveniently determining the occlusal plane in every instance so that the plaster models may be properly constructed and that resultant efficient articulation may be performed.

Objects of this invention are to overcome the above difficulty; and to provide a simple and efficient measuring apparatus for readily and conveniently determining the occlusal plane in every instance; and to provide improved means for accurately positioning the upper and lower plates relatively to each other for articulation purposes.

An illustrated embodiment of the invention is shown in the accompanying drawings, in which:

Fig. 1 is a perspective view showing the apparatus attached to a patient; Fig. 2 is a side elevation of the apparatus shown in Fig. 1; Fig. 3 is an enlarged detail view of an end portion of the U-shaped attached member; and Fig. 4 is a sectional view of the adjusting block; Fig. 5 is an enlarged plan view of the bite member and rigid supporting element; Fig. 6 is a sectional elevation of the arrangement shown in Fig. 5 in addition to the upper plate; and Fig. 7 is a view similar to Fig. 6 in addition to the lower plate and showing the manner of assembly.

The illustrated embodiment of the invention comprises a substantially U-shaped supporting member which may consist of a metallic strip and this member is shaped to fit around the face of a patient below the alæ of the nose. Adjustably attached to the end portions of the U-shaped member 1 are extensible members 2 having longitudinal slots 3 to receive the end portions of the support 1, a set screw 4 on the extension 2 being adapted to engage the member 1 for holding the latter in adjusted position. The extension 2 is substantially L-shaped and formed on the end of the extension is a knob 5, which is adapted to extend into the auditory meatus of the ear. By adjusting the extension 2 on the U-shaped support 1, the support may be adjusted to fit the faces of individual patients so in every instance this member may be properly positioned relative to the alæ of the nose and the auditory meatus.

Slidable on the U-shaped member 1 is a block 5 having a transverse slot 6 to receive the support 1, a set screw 7 being provided for locking the block 5 in its adjusted position. Formed in the block 5 in the region above the slot 6 is a transversely extending hole to receive a pin 8, the ends of which project from opposite sides of the block. Formed on opposite ends of the pin 8 are socket members 9 to receive the end portions of a yoke 10, set screws 11 in the socket members 9 being adjustable to engage the arms of the yoke 10 for holding the latter against movement. The yoke 10 terminates in a ball or knob 12 which is supported by a socket member 13 fixed to a head band 14.

The head band 14 may be of any suitable type which may be readily adjusted to the head of the patient and it will be seen from this arrangement that the head band 14 cooperates in holding the U-shaped support 1 in proper position and by means of the several adjustments above described the apparatus may be readily adjusted to the heads of the patients.

A hole 15 is formed in the lower portion of the block 5 and extends at right angles to the U-shaped support 1. The hole 15 is adapted to receive a pin 16 and in positioning the pin 16 the latter should be inserted into the hole 15 until it engages or contacts with U-shaped support 1. Thereafter a set screw 17 may be tightened to hold the pin in place. The pin 16 may be the incisal guide pin employed in the articulator shown and described in my copending application and it will be seen that the relative position of the guide pin 16 and U-shaped support 1 corresponds to the relative position of the upper model support and the incisal guide pin in the articulator commercially known as the "Gysi simplex articulator" which is well known to the dental profession and is illustrated in the aforesaid application.

Slidable on the pin 16 is a sleeve-like block 18 having a lateral lug 18ª provided with a set screw 18ᵇ. A bite member 19 is adapted to project into the mouth of the patient and the outer end thereof is inserted thru the opening in the lug 18ª, the bite member 19 extending at approximately right angles to the pin 16. A set screw 20 is provided for securing the block 18 and the bite member in the desired vertical position in the pin 16.

As indicated in Figures 5 to 7 the bite member 19 comprises a stem 21 and a flat yoke shaped support 22. The support 22 is provided with rows of apertures 23 and surfacing elements 24 may be mounted on the upper surface of the support 22, the holes 23 being adapted to receive screws 25 for detachably connecting the surfacing element 24 to the support 22. It will be seen that the holes or apertures 23 are spaced from each other so that different sized surfacing elements 24 may be mounted on the support 22, the size used depending upon the size of the patient's plate. Connected to the upper surface of the surfacing element 24 are sharp pointed screws 26, in this instance there being three in number and the points projecting outwardly therefrom.

In practice, the upper plate A of a set is first placed in the patient's mouth and thereafter the bite member 19 having the surfacing element 24 mounted thereon is placed in the mouth and moved against the lower portion of the upper plate so as to fasten the surfacing element 24 firmly in the soft wax of upper plate. The bite member 19, surfacing element 24, and upper plate A in assembled form are removed from the mouth and the bite member 19 detached from the surface element 24 by removing the screws 25.

Thereafter wire surfacing element 24 is reenforced in the plate A by means of wax or other similar substance so that it is firmly embedded in the substance of the plate. The upper plate A is then replaced in the patient's mouth and thereafter the lower plate B of the set is placed in the mouth and the patient is required to chew on the lower plate, moving one plate on the other so as to allow free and natural movements of the mandibular muscles. After the patient has done this the bite member 19 is again attached to the surfacing element 24 by means of screws having sharp pointed heads 27, and this assembly is replaced in the mouth. The patient is then required to bite on central occlusion and this causes the sharp pointed heads 27 to extend into the soft wax of the lower plate B so that the upper plate A and lower plate B are attached to the bite member 19.

Thereafter the stem 21 of the bite member 19 is attached to the block 18 which is then properly positioned on the pin 16 so that the position of central occlusion on the pin 16 is indicated. The set screws 18ᵇ and 20 are then tightened to screw the block 18 against movement on the pin 16. The next operation is to remove the apparatus or disengage the apparatus from the pin 16 so that the pin 16 bite member 19 and upper and lower plates A and B respectively, may be removed from the patient's mouth. It will now be seen that by attaching the pin 16 to the articulator the plates A and B are accurately positioned and the plaster models may be built up in proper relation.

While I have shown and described a construction which admirably fulfills the objects of my invention, it is to be understood that the above is given merely by way of illustration and not of limitation, and numerous changes in details of construction, arrangement and operation may be effected without departing from the spirit of the invention, especially as defined in the appended claims.

What I claim as new and desire to secure by Letters Patent is:—

1. In a measuring apparatus, a substantially U-shaped member adapted to fit around a patient's face below the nose, extensible end portions in said member provided with elements engageable with the ears, means adapted to be attached to the upper part of the head for supporting said member, a horizontally adjustable element on the forward portion of said member and a depending guide pin detachably secured to said horizontally adjustable element.

2. In a measuring apparatus, a substantially U-shaped member adapted to fit around a patient's face below the nose, extensible end portions on said member having elements engageable with the ears, adjustable means adapted to be attached to the upper part of the head and engaging said U-shaped member, a horizontally adjustable element on said U-shaped member, a depending pin detachably engaged by said last member, said pin constituting the incisal guide pin of an articulator, and a bite member slidable on said pin and adapted to project into the patient's mouth.

3. In a measuring apparatus, an adjustable head band, a bail-like member adapted to fit over a person's face directly below the nose, a yoke associated with said band and member, means on the ends of said member to engage the ears, a slide on said member, a pin depending from said slide and detachably connected thereto, and a bite member slidable on said pin.

4. In a measuring apparatus, an adjustable head band, a U-shaped member adapted to fit around a patient's face below the alæ of the nose, extensions on said member having portions engageable with the auditory meatus, means for supporting the outer end portion of said member, and a guide pin detachably secured to said slide and depending therefrom, said pin having a bite plate adjustable thereon.

5. In a device of the class described, a clamping member adapted to be attached to a patient and extend from a point directly beneath the nose to the ear, a horizontally adjustable supporting element on said clamping member, and a vertically depending pin detachably connected to said supporting element, said pin being adapted to support a bite member.

6. The method substantially as hereinbefore described, which consists in inserting the upper plate into the patient's mouth, embedding a rigid surfacing element in said plate while the plate is in the mouth, placing the lower plate in the mouth, and requiring the patient to chew on the lower plate thereby to secure free and natural muscular movements in the region of the lower plate.

7. The method substantially as hereinbefore described, which consists in placing the upper plate in the patient's mouth, embedding a rigid surfacing element in said plate, placing the lower plate in the mouth, requiring the patient to bite on the lower plate, attaching the surfacing element to a bite member by screws having pointed heads, and requiring the patient to bite on central occlusion thereby to connect the upper and lower plates in assembled relation on said bite member.

In testimony whereof I have hereunto signed my name to this specification.

PERCIVAL A. GOULD.